United States Patent [19]

Gras et al.

[11] Patent Number: 5,046,924
[45] Date of Patent: Sep. 10, 1991

[54] PROCESS AND CIRCUIT ARRANGEMENT FOR CONTROLLING A CONSUMER DRIVEN BY AN INTERNAL COMBUSTION ENGINE

[75] Inventors: Jürgen Gras, Bietigheim-Bissingen; Jan-Tian Tjoa, Ludwigsburg, both of Fed. Rep. of Germany

[73] Assignee: Robert Bosch GmbH, Stuttgart, Fed. Rep. of Germany

[21] Appl. No.: 477,887
[22] PCT Filed: Aug. 16, 1989
[86] PCT No.: PCT/DE89/00531
§ 371 Date: Apr. 12, 1990
§ 102(e) Date: Apr. 12, 1990
[87] PCT Pub. No.: WO90/02664
PCT Pub. Date: Mar. 22, 1990

[30] Foreign Application Priority Data

Sep. 1, 1988 [DE] Fed. Rep. of Germany ....... 3829635

[51] Int. Cl.$^5$ .............................................. F04B 49/08
[52] U.S. Cl. .................................... 417/15; 62/228.3; 62/323.4; 290/51; 417/34
[58] Field of Search ...................... 62/323.4, 133, 158, 62/228.3; 417/15, 34; 290/40 A, 40 B, 40 C, 51

[56] References Cited

U.S. PATENT DOCUMENTS

| | | | |
|---|---|---|---|
| 4,135,368 | 1/1979 | Mohr et al. | 62/133 |
| 4,269,033 | 5/1981 | Birch | 62/133 |
| 4,391,242 | 7/1983 | Mashio | 62/323.4 X |
| 4,414,820 | 11/1983 | Morris | 62/228.3 X |
| 4,488,410 | 12/1984 | Seiderman | 62/323.4 X |
| 4,556,942 | 12/1985 | Russo et al. | 62/323.4 X |
| 4,703,627 | 11/1987 | Nakajima | 62/133 |
| 4,723,416 | 2/1988 | Suzuki | 62/226 |

FOREIGN PATENT DOCUMENTS

| | | |
|---|---|---|
| 0199536 | 10/1986 | European Pat. Off. . |
| 0281152 | 9/1988 | European Pat. Off. . |
| 2095838 | 10/1982 | United Kingdom . |

Primary Examiner—William E. Tapolcai
Attorney, Agent, or Firm—Walter Ottesen

[57] ABSTRACT

A method for controlling a consumer driven by an internal combustion engine 1 is suggested, especially a compressor 2 of an air-conditioning system of a motor vehicle, in which before the compressor is put into operation, the power output of the internal combustion engine is increased by a fixed amount before the compressor is switched on after a predetermined delay. The method is characterized in that the load occurring on the internal combustion engine as a result of the operation of the consumer is determined before the consumer is put into operation, and in that the power output of the internal combustion engine is increased as a function of the expected load, and the consumer is then put into operation. Preferably, to determine the expected load on the internal combustion engine, the pressure in the high-pressure region of the compressor is measured by means of a sensor 6. Thus, the power of the internal combustion engine is matched as closely as possible to the load occurring as a result of the operation of the consumer. Therefore, there is virtually no decrease in power of the internal combustion engine even immediately when the consumer is switched on, thus ensuring a jerk-free switching-on of the consumer. n 11 Claims, 1 Drawing Sheet

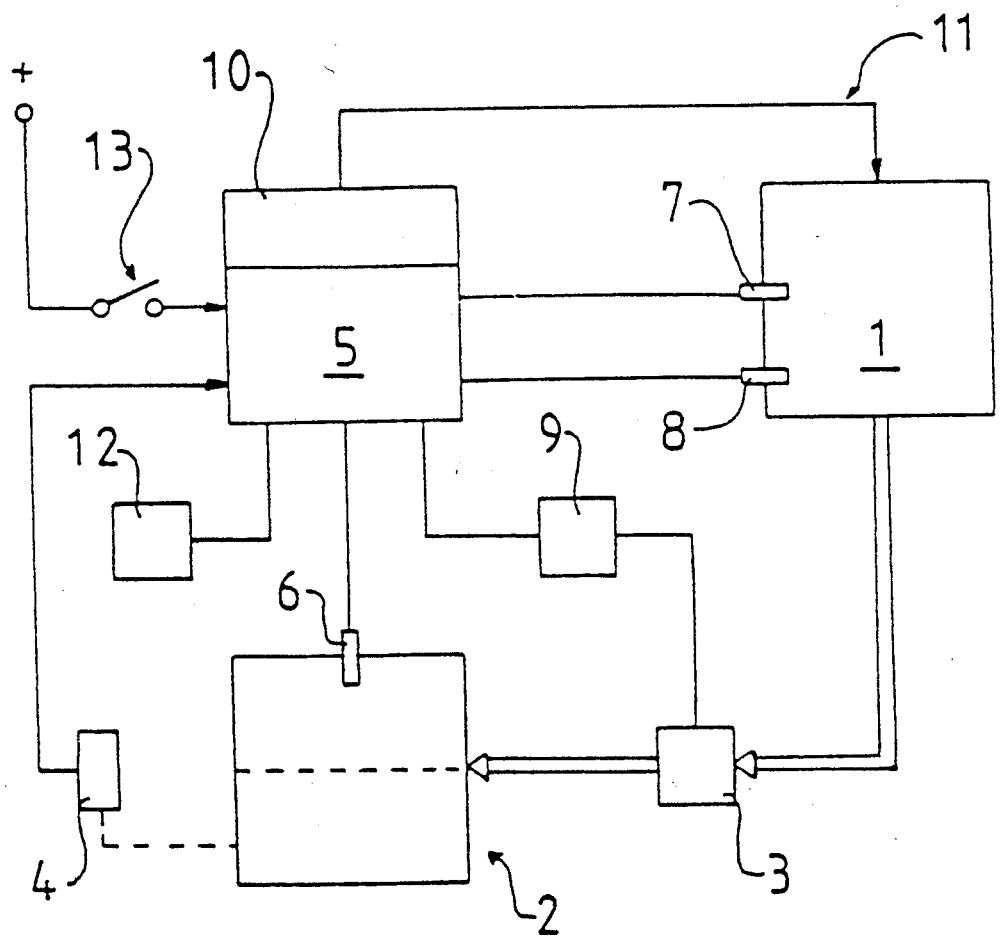

PROCESS AND CIRCUIT ARRANGEMENT FOR CONTROLLING A CONSUMER DRIVEN BY AN INTERNAL COMBUSTION ENGINE

FIELD OF THE INVENTION

The invention relates to a method for controlling a consumer driven by an internal combustion engine.

The invention further relates to a control apparatus for carrying out a method of the above kind; furthermore, the invention relates to the use of a pressure sensor arranged in the high-pressure region of a compressor of an air-conditioning system of a motor vehicle and intended for controlling the compressor, and finally, the invention relates to the use of a control apparatus for controlling the functions of an internal, combustion engine to control a consumer driven by the internal combustion engine.

BACKGROUND OF THE INVENTION

A method for controlling a compressor of an air-conditioning system is known, and in this method the power output of the internal combustion engine is increased, for example, by raising the engine speed or by increasing the quantity of air fed to the internal combustion engine, before putting the compressor into operation with a predetermined delay. In this method, the power output is increased each time by the amount of a predetermined fixed value. The delay before the compressor is switched on is necessary because the power output of the internal combustion engine cannot always be increased abruptly. It is also known, in a method of this type, to use a control unit for controlling the functions of an internal combustion engine. That means, the compressor of the air-conditioning system is no longer controlled directly by a thermostat mounted, for example, in the vehicle interior. Instead, the thermostat signal is sent to the control apparatus which, in response to this signal, first increases the power output of the internal combustion engine and then switches in the compressor with a delay. The increase in the power output of the internal combustion engine serves for keeping the speed of the internal combustion engine as constant as possible even when the compressor is switched on.

A disadvantage of this method is that the load on the internal combustion engine during switching-on of the compressor is not constant. For example, the switching-on of the compressor exerts a greater load on the internal combustion engine at high outside temperatures than at low temperatures. The load on the internal combustion engine when the compressor is switched on is higher when a high pressure prevails in the high-pressure region of the latter. This occurs when the compressor is switched on frequently because of high outside temperatures.

Therefore, in the known process and under specific preconditions, there are still pronounced fluctuations in power of the internal combustion engine when the compressor is switched on.

SUMMARY OF THE INVENTION

In contrast, the advantage of the method according to the invention is that, whenever the compressor is activated, the power output of the internal combustion engine is always at its optimal setting. The result is that the air-conditioning system is switched on virtually free of jerks.

In an especially preferred method, the pressure in the high-pressure region of the compressor is measured in order to determine the anticipated load on the internal combustion engine. The force required for starting the compressor is the greater, the higher the pressure is in the high-pressure region. As a result of the pressure measurement, the load occurring on the internal combustion engine when the compressor is put into operation can therefore be predetermined very accurately and the power output of the engine can be adapted accordingly.

Moreover, a method is preferred wherein the consumer is put into operation at the end of a predeterminable delay time. Sufficient time thereby remains to raise the power output of the internal combustion engine according to the load expected from switching on the consumer.

In a further preferred method, the temperature of the internal combustion engine is determined and the delay time is set as a function of this temperature. It is thereby possible, for example, to postpone switching on the consumer at low engine temperatures until a higher power output of the internal combustion engine is set.

In a further preferred method, the temperature of the internal combustion engine is determined and the power output of the engine is increased as a function of this temperature. The power output can thereby be set optimally at all engine temperatures in order to allow a jerk-free switching-on of the air-conditioning system in all the operating states of the internal combustion engine.

By determining the temperature it is also possible, for example, to prevent switching on the compressor of the air-conditioning system at especially high engine temperatures so that no further load is applied to the engine.

Another method is also preferred wherein the instantaneous load state of the internal combustion engine is detected, and in which the compressor is prevented from being put into operation when a predeterminable upper load value is exceeded. Thus, for example, if the full power of the internal combustion engine is being used for an acceleration operation, a power reduction as the result of the switching-on of the compressor is avoided.

The control circuit according to the invention for carrying out a method of the above type has the advantage that the pressure prevailing in the high-pressure region of a compressor is detected by means of a sensor, with the result that the load on the internal combustion engine occurring during switching-on of the compressor can be predicted very accurately. Consequently, by means of a suitable control arrangement the power output of the internal combustion engine can be increased as a function of the measured pressure in such a way that switching on the compressor can take place virtually free of jerks.

In a preferred control circuit, a delay member is provided by means of which the consumer or the compressor is operable only after a predeterminable delay time. For example, after starting the internal combustion engine, a delay time of 10 to 20 seconds can be selected during which the compressor is not put into operation. The internal combustion engine is thus not subjected to additional load in the time when all the engine control operations are in a transient state.

In a further preferred control circuit, a monitoring circuit is provided by means of which the operating capability of individual switch elements or groups of switch elements is checked. If there is a fault, the compressor is prevented from being put into operation thereby excluding the possibility of overloading the internal combustion engine.

BRIEF DESCRIPTION OF THE DRAWINGS

An embodiment of the invention is illustrated in the drawing which shows a basic sketch of a control circuit according to the invention in the form of a block diagram.

DESCRIPTION OF THE PREFERRED EMBODIMENTS OF THE INVENTION

The figure illustrates a control circuit for carrying out a method for controlling a consumer driven by an internal combustion engine. The condenser or compressor of an air-conditioning system of a motor vehicle has been selected here as an example of a consumer.

The control circuit has a control unit which serves for controlling the functions of the internal combustion engine. Control units of this type are known; there is therefore no need to deal with their function in any more detail here.

The figure shows a block diagram to illustrate the functioning of an air-conditioning system driven by an internal combustion engine 1 of a vehicle and having a compressor 2. A switch member designed as a controllable coupling 3 is provided between the internal combustion engine 1 and the compressor 2. An electromagnetic coupling is preferably chosen.

The compressor of the air-conditioning system can be switched on, on the one hand, when the temperatures in the interior of the motor vehicle are too high, but also when the air humidity inside the vehicle is too high. A temperature-dependent switch-on is obtained, for example, by means of a thermostat located inside the vehicle. In simple air-conditioning systems, the compressor is switched on directly by the thermostat of the air-conditioning system. For this, a connection between the thermostat and compressor is necessary, this connection being represented by a broken line in the figure.

It is evident from the figure that there is no direct connection between the thermostat 4 and the compressor 2 here. Instead, the output signal from the thermostat is fed to a control unit 5.

The control unit 5 receives further data from various sensors. For example, on the high-pressure end of the compressor there is a pressure sensor 6 which detects the pressure prevailing there and which transmits corresponding signals to the control unit 5. The pressure sensor can be designed, for example, so that it transmits a voltage which is proportional to the pressure of the cooling fluid of the air-conditioning system. At the same time, for example, the output voltage at the pressure sensor 6 can change from 0 to 5V when the pressure in the high-pressure region of the compressor rises from 0 to 30 bar.

The temperature of the internal combustion engine 1 is detected by means of a temperature sensor 7. For example, the temperature of the cooling fluid or that of the oil of the internal combustion engine can be measured. The temperature sensor 7 is connected to the control unit 5 via a line.

The load state of the internal combustion engine can be detected by means of a further so-called load sensor 8. Thus, for example, the position of the throttle flap or that of a displacement transmitter connected to the accelerator pedal can be determined. The output signal from this sensor too is fed to the control unit 5.

Furthermore, there is a delay circuit 9 which is inserted between the control unit 5 and the coupling 3.

Moreover, the control unit has a control device 10 which is connected to the internal combustion engine via a line 11.

There is also a monitoring circuit 12 which monitors the functioning of individual switch elements or groups of switch elements. For this, the monitoring circuit is connected, for example, to the thermostat 4, the compressor 2, the pressure sensor 6, the delay circuit 9, the load sensor 8, the temperature sensor 7, the control device 10 and also to individual switch units of the control unit 5. The lines necessary for this are not shown here for the sake of clarity in the figure.

Finally, there is a switch 13 which is designed as a normally open switching contact and which is connected to a suitable voltage source. By means of this switch, the compressor can be switched on independently of the thermostat or of the temperature in the interior of the motor vehicle, for example when the air humidity in the vehicle is too high. Instead of the mechanical switch according to the figure, an electronic switch can also be provided.

Conventionally, a control unit for controlling an internal combustion engine contains all the signals described as necessary here, for example the engine temperature and load state of the internal combustion engine. Only the pressure-sensor signal has to be introduced additionally. The switch 13 and the delay circuit 9 can also be integrated into the control unit 5 which controls the compressor of the air-conditioning system via a switch, for example an electrical relay.

The process for controlling a consumer driven by an internal combustion engine and thereby the functioning of the circuit illustrated in the figure is explained in detail below.

As soon as the temperature in the interior of a motor vehicle exceeds a predeterminable limit value, the thermostat 4 transmits a corresponding output signal to the control unit 5. The compressor 2 is not switched on directly as a result of this signal. On the contrary, the operating state of the compressor 2, in general, the operating state of the consumer to be connected, is first determined. This is carried out by means of the pressure sensor 6 which detects the pressure prevailing in the high-pressure region of the compressor and which transmits a corresponding output signal to the control unit 5. The pressure and consequently the expected load on the internal combustion engine are measured at a specific discrete moment, but preferably continuously.

To prevent that the power of the internal combustion engine 1 is noticeably reduced during the switch-on of the compressor 2, there is first an increase in the power output of the engine. This is obtained by means of a corresponding signal from the control device 10 via the line 11. It is not important here how the power output of the internal combustion engine is increased. Thus, it is possible, for example, to increase the air quantity fed to the internal combustion engine by means of the control device 10. It is also possible to adjust the ignition angle appropriately in order to increase the power output. For example, the fuel/air mixture fed to the internal combustion engine can also be enriched. This last solution is especially suitable for lean-burn engines.

Only after the power output of the internal combustion engine has been increased is the compressor 2 switched on. In order to ensure an increase in power of the internal combustion engine, the compressor is switched on only after a certain delay time. The delay time can be varied by the control unit 5. The delay is ensured by the delay circuit 9.

After the delay time has elapsed, the coupling 3 provided between the internal combustion engine 1 and compressor 2 is activated, so that a transmission of power from the internal combustion engine to the compressor takes place.

From the foregoing it is evident that, for example, the air quantity fed to the internal combustion engine is increased before the compressor is switched on. It is thereby possible for the compressor to be switched on virtually free of jerks. Since the pressure on the output end of the compressor 2 has been determined by means of the pressure sensor 6, the increase in power can be matched to the instantaneous operating state of the compressor. Thus, if a high pressure prevails on the output side of the compressor, that is, the load on the internal combustion engine is high when the compressor is switched on, then the power of the internal combustion engine is increased to a greater extent before the compressor is put into operation than when the pressure on the high-pressure end of the compressor is low.

The degree of increase in power can be adapted to various circumstances. For example, the temperature of the internal combustion engine 1 can be detected by means of the temperature sensor 7. If this temperature is still relatively low, a higher increase in power of the internal combustion engine is predetermined by means of the control device 10 before the switch-on of the compressor 2. It is also possible to compare the temperature of the internal combustion engine with a limit value and completely prevent the compressor from being put into operation if an upper limit value is exceeded. This avoids overloading the engine by switching on the compressor.

The instantaneous load state of the internal combustion engine 1 can also be detected by means of a suitable sensor 8. When a predeterminable upper load value is exceeded, for example when the internal combustion engine is under full load, the compressor 2 can be prevented from being switched on in order to exclude the possibility of overloading the internal combustion engine.

Also, the data from various sensors can be combined. For example, the switch-on of the compressor 2 can also be prevented when, under a specific load of the internal combustion engine, a predeterminable pressure limit value in the high-pressure region of the compressor is exceeded.

The delay circuit 9 can be designed such that there is basically no activation of the compressor 2 via the coupling 3 for a predetermined time of, for example, 10 to 20 seconds after the starting of the internal combustion engine 1. The control unit 5 is thereby allowed sufficient time to set all the functions of the internal combustion engine to their optimal values. Only after the transient state of the engine control operations can the compressor then be switched on for the first time.

The monitoring circuit 12 shown in the figure and belonging to the control circuit performs a safeguarding function. The monitoring circuit 12 determines when individual elements of the circuit, that is, for example, sensors or subsystems of the control unit 5, are defective. As soon as a defect is determined, the control unit 5 ensures that consumers not absolutely necessary, such as the compressor of an air-conditioning system, are not put into operation. This avoids an unnecessary load on the internal combustion engine 1 in the event of a fault. The monitoring circuit can also be integrated into the control unit 5.

When the air humidity in the interior of a motor vehicle is too high, the air-conditioning system can be switched on by means of the switch 13 independently of the thermostat 4. A command to switch on the compressor 2 of the air-conditioning system is transmitted by this switch which is connected on the one hand to a voltage source and on the other hand to the control unit 5. This switch-on signal is comparable to that which the thermostat 4 transmits when the temperature in the interior of the vehicle is too high. The functioning of the control circuit is the same, irrespective of whether the air-conditioning system is switched on when the temperature is too high or when the air humidity is too high. That is, before the compressor 2 is put into operation the power output of the internal combustion engine 1 is increased as a function of the load to be expected from the operation of the compressor. In this case too, the compressor is switched on by means of the delay circuit 9 only when the increased power output of the internal combustion engine 1 is ensured. The above-described functions of the control circuit are otherwise identical, and therefore there is no need for a detailed description of these here.

It is ensured, at all events, that, before the consumer or the compressor 2 is switched on, the power of the internal combustion engine 1 is increased as a function of the load to be expected from the consumer. This results in a jerk-free switch-on of the consumer in virtually all the speed ranges of the internal combustion engine. When the internal combustion engine is idling, a possibility of a drop in the engine speed is virtually eliminated. Moreover, the control circuit according to the invention or the method described here ensures that the internal combustion engine 1 is protected against overloading, because operating states, such as the temperature or load of the internal combustion engine, are integrated into the control operation.

From the schematic of the control circuit and from the description of the method for controlling a consumer driven by an internal combustion engine it is apparent that an ideal control of the compressor is possible by the use of a pressure sensor arranged in the high-pressure region of a compressor of an air-conditioning system of a motor vehicle. This is possible because, before the compressor is put into operation, the power output of the internal combustion engine of the motor vehicle is increased as a function of the load occurring on the internal combustion engine.

The output signals of a sensor of this type are fed to a control unit for controlling the functions of an internal combustion engine which has the properties described above. The control unit 5 evaluating the output signals from the pressure sensor can be designed such that the compressor of the air-conditioning system is prevented from being switched on both when an upper pressure limit value is exceeded and when the pressure falls below a predeterminable lower pressure limit value. Pressure switches and/or pressure sensors otherwise necessary for safeguarding the functioning of an air-conditioning system can therefore be omitted.

To carry out the method described with reference to the figure, it is possible to use a control unit for controlling the functions of an internal combustion engine to control a consumer driven by the internal combustion engine, especially a compressor of an air-conditioning system of a motor vehicle. The control unit has a sensor detecting the load exerted on the internal combustion engine by the compressor before the latter is put into operation and a control unit increasing the power output of the engine as a function of the load exerted on the engine by the compressor. The operation of such a control apparatus is substantially improved in such a use. In particular, a jerk-free switch-on of a consumer or compressor of an air-conditioning system can be achieved. Moreover, as explained above by means of the description of the figure, there can be additional safety functions which improve the running of an internal combustion engine in conjunction with the control of a consumer. Faults are detected reliably and there is no possibility of additional loads on the internal combustion engine, for example from consumers, such as compressors of air-conditioning systems, in the event of faults.

We claim:

1. A method for controlling a consumer which can be decoupled and coupled to an internal combustion engine so as to be driven thereby, the method comprising the steps of:
   determining the anticipated load which the consumer will place on the engine before coupling the consumer to the engine;
   increasing the power output of the engine so as to adapt said power output to the determined anticipated load; and,
   after the power of the engine has been adapted to said anticipated load, coupling the consumer to the engine.

2. The method of claim 1, wherein the consumer is a compressor of an air conditioning system of a motor vehicle.

3. The method of claim 2, wherein the anticipated load is determined continuously.

4. The method of claim 2, comprising the further step of measuring the pressure in the high-pressure region of the compressor to determine the anticipated load on the engine.

5. The method of claim 1, wherein the consumer is coupled to the engine put into operation after a predeterminable delay time has elapsed.

6. The method of claim 2, wherein the temperature of the internal combustion engine is determined and the delay time is selected as a function of the temperature.

7. The method of claim 2, comprising the further steps of:
   determining the temperature of the engine; and,
   also increasing the power output of the engine as a function of the temperature.

8. The method of claim 2, comprising the further steps of:
   determining the temperature of the engine; and,
   preventing the compressor from being put into operation when an upper limit value of the temperature is exceeded.

9. The method of claim 2, comprising the further steps of:
   detecting the instantaneous load on the engine; and,
   preventing the compressor from being put into operation when a predeterminable upper value of the load is exceeded.

10. The method of claim 1, wherein the consumer has a property which varies and is indicative of said anticipated load at any particular time, the method comprising the further step of: monitoring said property and utilizing said property for determining said anticipated load.

11. The method of claim 10, wherein said consumer is a compressor and said property is pressure which is monitored by a pressure sensor.

* * * * *

UNITED STATES PATENT AND TRADEMARK OFFICE
CERTIFICATE OF CORRECTION

PATENT NO. : 5,046,924
DATED : September 10, 1991
INVENTOR(S) : Jürgen Gras and Jan-Tian Tjoa It is certified that error appears in the above-identified patent and that said Letters Patent is hereby corrected as shown below:

On the title page, in the Abstract, line 4, after "which", insert -- , --.

On the title page, in the Abstract, in the last line, after the period, delete "n".

In column 1, line 17, between "internal" and "combustion", delete ",".

In column 3, line 6: delete "DRAWINGS" and substitute -- DRAWING -- therefor.

Signed and Sealed this

Twenty-fifth Day of May, 1993

Attest:

MICHAEL K. KIRK

Attesting Officer    Acting Commissioner of Patents and Trademarks